(12) United States Patent
Asahina

(10) Patent No.: US 10,082,967 B2
(45) Date of Patent: Sep. 25, 2018

(54) TRANSFER APPARATUS AND RECOVERY CONTROL DEVICE

(71) Applicant: ALAXALA NETWORKS CORPORATION, Kawasaki-shi, Kanagawa (JP)

(72) Inventor: Toru Asahina, Kawasaki (JP)

(73) Assignee: ALAXALA NETWORKS CORPORATION, Kanagawa (JP)

(*) Notice: Subject to any disclaimer, the term of this patent is extended or adjusted under 35 U.S.C. 154(b) by 249 days.

(21) Appl. No.: 14/857,951

(22) Filed: Sep. 18, 2015

(65) Prior Publication Data

US 2016/0239225 A1    Aug. 18, 2016

(30) Foreign Application Priority Data

Feb. 17, 2015 (JP) .................. 2015-028668

(51) Int. Cl.
*G06F 11/16* (2006.01)
*G06F 3/06* (2006.01)

(52) U.S. Cl.
CPC .......... *G06F 3/0617* (2013.01); *G06F 3/0632* (2013.01); *G06F 3/0647* (2013.01); *G06F 3/0685* (2013.01); *G06F 11/1658* (2013.01); *G06F 11/1666* (2013.01)

(58) Field of Classification Search
CPC ............. G06F 11/1658; G06F 11/1666; G06F 3/0617; G06F 3/0632; G06F 3/0647
See application file for complete search history.

(56) References Cited

U.S. PATENT DOCUMENTS

| 6,029,227 A * | 2/2000 | Uchimura | ............... G06F 3/061 710/17 |
| 6,564,228 B1 * | 5/2003 | O'Connor | ............. G06F 3/0604 |
| 7,805,583 B1 * | 9/2010 | Todd | ..................... G06F 3/0617 711/161 |
| 2005/0100012 A1 * | 5/2005 | Kaxiras | ................. H04L 45/742 370/389 |
| 2005/0196171 A1 * | 9/2005 | Dybesetter | ............. H04B 10/40 398/135 |

(Continued)

FOREIGN PATENT DOCUMENTS

JP          2013-187601 A      9/2013

*Primary Examiner* — Yolanda L Wilson
(74) *Attorney, Agent, or Firm* — Volpe & Koenig, P.C.

(57) ABSTRACT

A transfer apparatus includes a CPU, a memory, a recovery control unit, a non-volatile memory coupled to the recovery control unit, a transfer engine, and a volatile memory, wherein the volatile memory stores a first transfer information base, wherein the non-volatile memory stores a second transfer information base, and the recovery control unit is configured to update the second transfer information base in a case of receiving an instruction to update the second transfer information base, transmit an instruction to update the first transfer information base to the transfer engine, check the consistency of the first transfer information base and the second transfer information base in a case where the transfer apparatus is rebooted, and recover the first transfer information base by using the second transfer information base in a case where the first transfer information base and the second transfer information base are consistent.

11 Claims, 8 Drawing Sheets

(56) References Cited

U.S. PATENT DOCUMENTS

| | | | |
|---|---|---|---|
| 2005/0213498 A1* | 9/2005 | Appanna | G06F 11/2028 370/216 |
| 2006/0123136 A1* | 6/2006 | Oku | H04L 45/00 709/250 |
| 2008/0177954 A1* | 7/2008 | Lee | G06F 12/126 711/154 |
| 2010/0014525 A1* | 1/2010 | Rehman | G06F 13/387 370/395.7 |
| 2010/0318746 A1* | 12/2010 | Troxel | G06F 11/1438 711/141 |
| 2012/0054441 A1* | 3/2012 | Nakashima | G06F 11/1441 711/124 |
| 2012/0233420 A1* | 9/2012 | Matsushita | G06F 11/2038 711/162 |
| 2013/0054947 A1* | 2/2013 | Gavrilov | G06F 9/4401 713/2 |
| 2013/0235872 A1 | 9/2013 | Bessho et al. | |
| 2014/0053016 A1* | 2/2014 | Dusanapudi | G06F 11/16 714/6.3 |
| 2015/0220439 A1* | 8/2015 | Mickens | G06F 3/061 711/135 |

* cited by examiner

TRANSFER APPARATUS AND RECOVERY CONTROL DEVICE

CLAIM OF PRIORITY

The present application claims priority from Japanese patent application JP 2015-28668 filed on Feb. 17, 2015, the content of which is hereby incorporated by reference into this application.

BACKGROUND OF THE INVENTION

The present invention relates to a data transfer apparatus.

In recent years, there has been increasing need for the reliability of a network system. Along with the needs, a data transfer apparatus that performs data transfer between networks constituting the network system is required to maintain data transfer as much as possible.

The data transfer apparatus transfers data to an appropriate transfer destination according to a routing table held by the data transfer apparatus. The routing table stores transfer destination information that is used to transfer data to a next destination from each network.

In many data transfer apparatuses of the related art, a dedicated device called a transfer engine transfers data so as to increase the speed of data transfer. Generally, transfer engines designed and manufactured by professional semiconductor manufacturers are used because the transfer engine is a device that is required to exhibit high performance.

Transferring data at high speed requires that the transfer destination of data be searched in a short amount of time. In order to realize this, a memory that is used in the search of the transfer destination of data is disposed in the data transfer apparatus, and a transfer information base is stored on the memory. The transfer information base is a data format into which the routing table is converted. The data format allows the transfer engine to easily search for the transfer destination.

Typically, volatile memories are used for the memory that stores the transfer information base. Thus, the transfer information base stored on the memory is lost when the data transfer apparatus is stopped.

When a reboot of the data transfer apparatus occurs, the data transfer apparatus is required to generate the routing table again and to store the transfer information base which is generated by the conversion of the routing table on the volatile memory. Therefore, the data transfer apparatus of the related art has the problem that a time of a few tens of seconds to a few minutes is typically required until data transfer is resumed after the process as described above is completed.

The invention disclosed in JP-A-2013-187601 is known as means for resolving the above problem. In JP-A-2013-187601, disclosed is as follows: "A router includes a routing table storing unit that stores a routing table, which is destination information of a packet, and that is readable and writable any time and a transfer information base storing unit that stores a transfer information base, which is created on the basis of the routing table and which is correspondence information between a destination to which the packet can be transferred and addresses which are appropriate for sending the packet to the destination through a shortest path, and that is readable and writable any time. The router is provided with a search engine unit that searches for addresses to send the packet on the basis of the transfer information base, a power supply unit that supplies power to the routing table storing unit and the transfer information base storing unit, and a control unit that controls the power supply unit. At least one of the routing table storing unit and the transfer information base storing unit is a non-volatile memory. The control unit causes power to be supplied from the power supply unit to the non-volatile memory when the non-volatile memory operates and blocks supply of power to the non-volatile memory when the non-volatile memory does not operate."

In the invention disclosed in JP-A-2013-187601, even if the packet transfer apparatus is rebooted, loss of the transfer information base is prevented because a non-volatile memory is used for the memory that is used in the search of the transfer destination of the packet. Thus, packet transfer can be quickly resumed.

SUMMARY OF THE INVENTION

Problems arise as follows when the transfer information base is stored on a non-volatile memory as the invention disclosed in JP-A-2013-187601.

One problem is that inconsistency occurs in transfer destination information stored in the transfer information base when the data transfer apparatus is rebooted during an update of the transfer information base. Another problem is that the transfer destination information stored in the transfer information base has the possibility of being outdated when the data transfer apparatus is stopped for a long time. Since data has the possibility of being transferred to an erroneous transfer destination due to these problems, it is necessary to use the transfer information base that is stored on the non-volatile memory when the search of the transfer destination can be performed appropriately.

In order to resolve the problems and to quickly resume data transfer at the time of reboot of the data transfer apparatus, it is necessary for devices other than the transfer engine, a CPU, and the like to determine whether the transfer information base stored on the non-volatile memory is appropriate as information used in the search of the transfer destination. However, since the transfer engine is generally designed and manufactured by professional semiconductor manufacturers, it is difficult to add functions used to perform the determination to the transfer engine and the like.

The present invention realizes a determination of whether a transfer information base stored on a non-volatile memory is appropriate as information used in the search without adding modifications to a transfer engine and realizes a data transfer apparatus quickly resuming data transfer.

The present invention can be appreciated by the description which follows in conjunction with the following figures, wherein: a transfer apparatus that transfers data, the apparatus comprising: a CPU; a memory coupled to the CPU; a recovery control unit coupled to the CPU which controls the recovery of information at a time of reboot of the transfer apparatus; a non-volatile memory coupled to the recovery control unit; a transfer engine coupled to the recovery control unit which controls the transfer of the data; and a volatile memory coupled to the transfer engine, wherein the memory stores routing information that indicates a transfer destination of the data, wherein the volatile memory stores a first transfer information base that is information corresponding to the routing information and that is used in a case where the transfer engine determines the transfer destination of the data, wherein the non-volatile memory stores a second transfer information base that is backup data of the first transfer information base, wherein the transfer engine is configured to: determine the transfer destination of data received by the transfer apparatus by using the first transfer information base; and transfer the received data to the determined transfer destination, and wherein the recovery control unit is configured to: update the second transfer information base on update data in a case of receiving an instruction to update the second transfer information base including the update data from the CPU; transmit an instruction to update the first transfer information base including the update data to the transfer engine; check the consistency of the first transfer information base and the second transfer information base in a case where the transfer apparatus is rebooted; and recover the first transfer information base by using the second transfer information base in a case where the first transfer information base is consistent with the second transfer information base.

According to the present invention, checking the consistency of a transfer information base stored on a non-volatile memory and quickly resuming data transfer at the time of reboot of the data transfer apparatus can be realized. Problems, configurations, and effects other than described above will become apparent from a description of an embodiment below.

BRIEF DESCRIPTION OF THE DRAWINGS

The present invention can be appreciated by the description which follows in conjunction with the following figures, wherein.

DETAILED DESCRIPTION OF THE EMBODIMENTS

Hereinafter, an embodiment will be illustrated by using the drawings.

Figure 1:
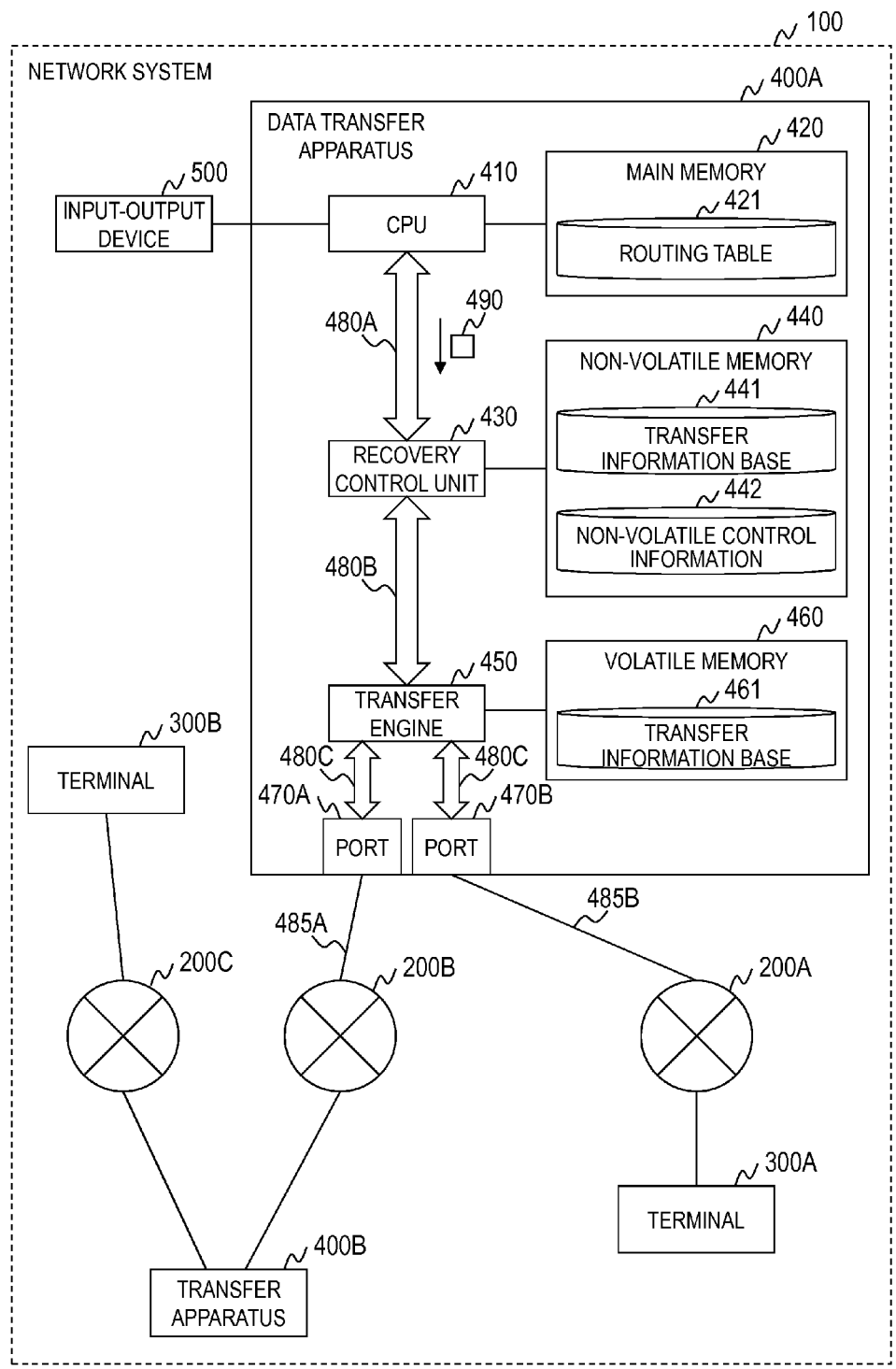
FIG. 1 is a descriptive diagram illustrating an example of a configuration of a network system and a configuration of a data transfer apparatus of an embodiment.

FIG. 1 is a descriptive diagram illustrating an example of a configuration of a network system 100 and a configuration of a data transfer apparatus 400 of the embodiment.

The network system 100 is configured of a plurality of networks 200, a plurality of terminals 300, and a plurality of data transfer apparatuses 400. In the example illustrated in FIG. 1, the network system includes three networks 200A, 200B, and 200C, includes two terminals 300A and 300B, and includes two data transfer apparatuses 400A and 400B.

The present embodiment is not limited to the numbers of networks 200, terminals 300, and data transfer apparatuses 400. In the present specification, the networks 200A, 200B, and 200C will be written as the network 200 if not distinguished from one another. The terminals 300A and 300B will be written as the terminal 300 if not distinguished from one another. The data transfer apparatuses 400A and 400B will be written as the data transfer apparatus 400 if not distinguished from one another. The terminal 300A and the data transfer apparatus 400A are connected to each other through the network 200A. The terminal 300B and the data transfer apparatus 400B are connected to each other through the network 200C. The data transfer apparatus 400A and the data transfer apparatus 400B are connected to each other through the network 200B. The network 200 is considered as, for example, a local area network (LAN) or a wide area network (WAN). However, the present embodiment is not limited to the type of network 200. Connection types between the terminal 300 and the network 200 and between the data transfer apparatus 400 and the network 200 may be either wired or wireless.

The terminal 300 transmits data that includes destination information to other terminal devices 300 through the network 200 and receives data that includes destination information from other terminal devices 300. The terminal 300 includes a central processing unit (CPU), a memory, a network interface, and the like that are not illustrated.

The data transfer apparatus 400, when receiving data from the terminal 300 or other data transfer apparatuses 400 through the network 200, transfers the data to an appropriate transfer destination according to the destination information included in the received data. A configuration of the data transfer apparatus 400 will be described with the data transfer apparatus 400A as an example. The data transfer apparatus 400B also has the same configuration.

The data transfer apparatus 400A is provided with a CPU 410, a main memory 420, a recovery control unit 430, a non-volatile memory 440, a transfer engine 450, a volatile memory 460, a port 470, and a bus 480. The CPU 410, the recovery control unit 430, and the transfer engine 450 will be written as one device if not distinguished from one another.

The CPU 410 and the recovery control unit 430 are connected to each other through a bus 480A. The recovery control unit 430 and the transfer engine 450 are connected to each other through a bus 480B. The transfer engine 450 and the port 470 are connected to each other through buses 480C. The port 470 is connected to the network 200 through a line 485.

Each device transmits a command 490 to other devices through the bus 480 and receives the command 490 from other devices through the bus 480. Accordingly, each device provides instructions to other devices, and reads and writes data on the information held by other devices or on the memories connected to other devices.

The CPU 410 controls the entire data transfer apparatus 400A. The CPU 410 of the present embodiment generates and updates a routing table 421 and provides an instruction to update a transfer information base 441 and a transfer information base 461.

The main memory 420 is connected to the CPU 410 and stores the routing table 421. A volatile memory such as a dynamic random access memory (DRAM) is assumed to be used for the main memory 420.

The routing table 421, for each network 200, stores transfer destination information that indicates the transfer destination of data. The transfer destination information stored in the routing table 421 is either statically set by an operator of the network system 100 or is dynamically set by transmitting and receiving the transfer destination information with other data transfer apparatuses 400. In the present embodiment, in addition to the above description, the routing table 421 is generated on the basis of the transfer information base 441 stored on the non-volatile memory 440 at the time of reboot of the data transfer apparatus 400A. Details of the routing table 421 will be described below by using FIG. 4.

The recovery control unit 430 stores the transfer destination information that is transmitted from the CPU 410 during a normal operation of the data transfer apparatus 400A in the transfer information base 441 of the non-volatile memory 440 and, furthermore, transmits an instruction to update the transfer information base 461 to the transfer engine 450 including the transfer destination information. Specifically, the recovery control unit 430, on the basis of the command 490 transmitted from the CPU 410, stores the transfer destination information that is included in the command 490 in the transfer information base 441 of the non-volatile memory 440. The recovery control unit 430 instructs the transfer engine 450 to update the transfer information base 461 of the volatile memory 460 by transmitting the command 490 that includes the transfer destination information to the transfer engine 450.

The recovery control unit 430 determines the consistency of the transfer information base 441 and the transfer information base 461 at the time of reboot of the data transfer apparatus 400A and, on the basis of the determination result, controls the recovery of the transfer information base 461 of the volatile memory 460 that uses the transfer information base 441.

The non-volatile memory 440 is connected to the recovery control unit 430 and stores the transfer information base 441 and non-volatile control information 442. The non-volatile memory 440 of the present embodiment is assumed to not have performance degradation due to data writing and to operate at approximately the same speed as the volatile memory 460. Examples of a non-volatile memory that satisfies these conditions include a magnetoresistive random access memory (MRAM), a resistance random access memory (ReRAM), and a ferroelectric random access memory (FeRAM).

The transfer information base 441 is backup data of the transfer information base 461 that the transfer engine 450 uses. The transfer information base 441, since being stored on the non-volatile memory 440, is not lost even if the data transfer apparatus 400A is stopped. The transfer information base 441, when the routing table 421 is updated, is rewritten on the basis of instructions from the CPU 410. As described below, the transfer information base 461 stored on the volatile memory 460 is also rewritten at the time of an update of the transfer information base 441.

The non-volatile control information 442 is information that is used to control processes that the recovery control unit 430 performs. In the present embodiment, the states of the transfer information base 441 and the transfer information base 461 are managed by using the non-volatile control information 442. Details of the non-volatile control information 442 will be described below by using FIG. 7.

The transfer engine 450 performs the transfer of received data through the network 200. Specifically, the transfer engine 450, when receiving data from the network 200 via the line 485, searches for the transfer destination of the data by using the transfer information base 461 stored on the volatile memory 460 and transfers the data to an appropriate transfer destination on the basis of the search result.

The volatile memory 460 is connected to the transfer engine 450 and stores the transfer information base 461. Examples of the volatile memory 460 include a static random access memory (SRAM) that has a high operation speed and a ternary content addressable memory (TCAM) that is specialized in search processes. When the volatile memory 460 stores the transfer information base 461 that is converted into a data structure such as a tree structure or a hash table appropriate for searching, an SRAM is used.

The transfer information base 461 is information of a data format into which the routing table 421 is converted. The data format is appropriate for the transfer engine 450 to search for the transfer destination of data. Details of the transfer information base 461 will be described below by using FIG. 5.

The port 470 is an interface for a connection to an external network or an external apparatus. In the present embodiment, the data transfer apparatus 400A is connected to the network 200B through a line 485A that is connected to a port 470A and is connected to the network 200C through a line 485B that is connected to a port 470B. The bus 480 connects configurations in the data transfer apparatus 400A. The command 490 flows in the bus 480.

In the case of the general data transfer apparatus 400, the CPU 410 and the main memory 420 are mounted on a control card, and the transfer engine 450 and the volatile memory 460 are mounted on a transfer card. Thus, various forms of mounting the recovery control unit 430 and the non-volatile memory 440 on the cards are considered.

For example, a form considered is mounting the recovery control unit 430 and the non-volatile memory 440 on either the control card or the transfer card. In addition, a form also considered is mounting the recovery control unit 430 on the control card and mounting the non-volatile memory 440 on the transfer card or mounting the non-volatile memory 440 on the control card and mounting the recovery control unit 430 on the transfer card. In addition, a form of mounting the recovery control unit 430 and the non-volatile memory 440 on the data transfer apparatus 400 as a recovery control card may also be possible. In addition, the control card, the transfer card, and the recovery control card may be configured to be swappable with respect to the data transfer apparatus 400.

The CPU 410, the main memory 420, the recovery control unit 430, the non-volatile memory 440, the transfer engine 450, and the volatile memory 460 may not be mounted as a card-type device. For example, the CPU 410, the main memory 420, the recovery control unit 430, the non-volatile memory 440, the transfer engine 450, and the volatile memory 460 may be mounted on the data transfer apparatus 400 as one chip.

Figure 2:
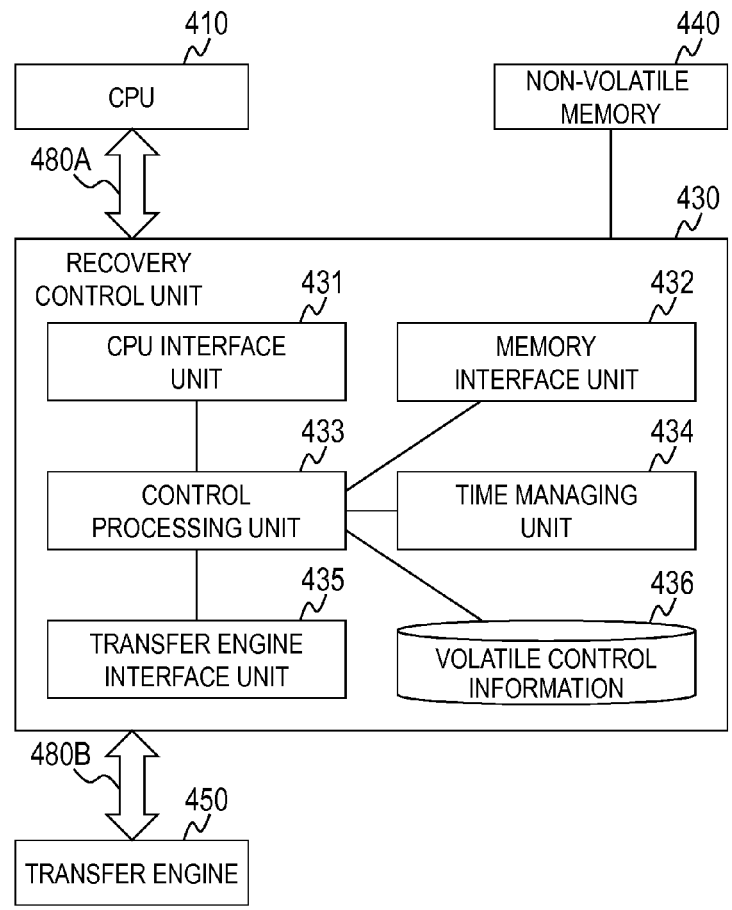
FIG. 2 is a block diagram illustrating an example of a configuration of a recovery control unit of the embodiment.

FIG. 2 is a block diagram illustrating an example of a configuration of the recovery control unit 430 of the embodiment.

The recovery control unit 430 includes a CPU interface unit 431, a memory interface unit 432, a control processing unit 433, a time managing unit 434, and a transfer engine interface unit 435 and holds volatile control information 436. The recovery control unit 430 includes an unillustrated volatile memory. The volatile memory stores the volatile control information 436, data that is temporarily held for processes, and the like.

The control processing unit 433 is connected to the CPU interface unit 431, the memory interface unit 432, the time managing unit 434, and the transfer engine interface unit 435 through an internal bus and the like. The control processing unit 433 is connected to the volatile memory on which the volatile control information 436 is stored through an internal bus and the like.

The CPU interface unit 431 performs the reception of the command 490 transmitted from the CPU 410. The CPU interface unit 431 transmits the command 490 to the CPU 410 according to instructions from the control processing unit 433.

The memory interface unit 432 reads and writes data at a directed address of the non-volatile memory 440 according to instructions from the control processing unit 433.

The control processing unit 433 controls the entire recovery control unit 430. The control processing unit 433, according to the contents of processes, transmits and receives instructions and data with the CPU 410 and the transfer engine 450 and reads and writes data on the non-volatile memory 440.

The time managing unit 434 manages time information stored in the volatile control information 436. The time managing unit 434, by a circuit that can be operated with a power supply such as a battery, keeps track of time even in a state where the data transfer apparatus 400 is stopped.

The transfer engine interface unit 435 transmits and receives the command 490 with the transfer engine 450 like the CPU interface unit 431.

The volatile control information 436 is information that is used to control processes that the recovery control unit 430 performs. In the present embodiment, the states of processes of the recovery control unit 430 are managed by using the volatile control information 436. The volatile control information 436, since being stored on the volatile memory included in the recovery control unit 430, is lost when the data transfer apparatus 400 is stopped. Details of the volatile control information 436 will be described below by using FIG. 6.

Figure 3:
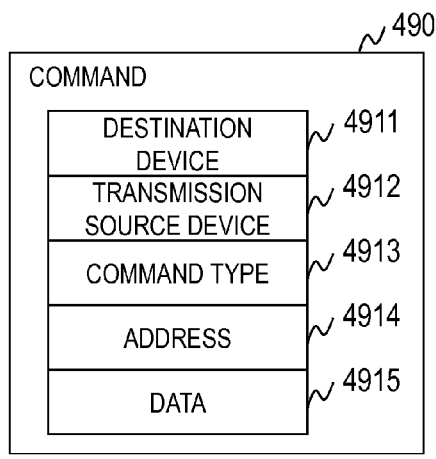
FIG. 3 is a descriptive diagram illustrating an example of a format of a command that is used in the data transfer apparatus of the embodiment.

FIG. 3 is a descriptive diagram illustrating an example of the format of the command 490 that is used in the data transfer apparatus 400 of the embodiment.

The command 490 is configured of a destination device 4911, a transmission source device 4912, a command type 4913, an address 4914, and data 4915.

The destination device 4911 is identifiable information of a device that is a transmission destination of the command 490. The transmission source device 4912 is identifiable information of a device that is a transmission source of the command 490. At least any of the CPU 410, the recovery control unit 430, and the transfer engine 450 is set in each of the destination device 4911 and the transmission source device 4912. The command type 4913 is information that indicates the type of command. Types of command include a read request, a read response, and a write request.

The address 4914 is the address of a memory region that is the process target for the command 490. The data 4915 is data that is the process target for the command 490. When the command type 4913 is set to "read request", only the address 4914 is set to a value, and the data 4915 is not set to a value. When the command type 4913 is set to either "read response" or "write request", both of the address 4914 and the data 4915 are set to a value.

Each device, by transmitting and receiving the command 490 with other devices, provides instructions to other devices, and reads and writes data on the information held by other devices or on the memories connected to other devices.

Providing instructions to other devices is performed by writing data on specific information held by other devices. A determination of whether information for reading data or information for writing data is the information held by other devices or the information stored on the memories connected to other devices is performed by the range of the address set in the address 4914.

The command 490 of which the command type 4913 is set to either "read request" or "read response" is used when data is read from the information held by other devices or from the memories connected to other devices.

A device, when the command type 4913 of the received command 490 is set to "read request", reads data from a memory region that corresponds to the value set in the address 4914 of the information held by the device or of the memory connected to the device. In addition, the device transmits the command 490 of which the command type 4913 is set to "read response" and of which the data 4915 is set to the read data to the transmission source device 4912 of the received command 490.

The command 490 of which the command type 4913 is set to "write request" is used when data is written to the information held by other devices or to the memories connected to other devices.

A device, when the command type 4913 of the received command 490 is set to "write request", writes the data 4915 to a memory region that corresponds to the value set in the address 4914 of the information held by the device or of the memory connected to the device.

Figure 4:
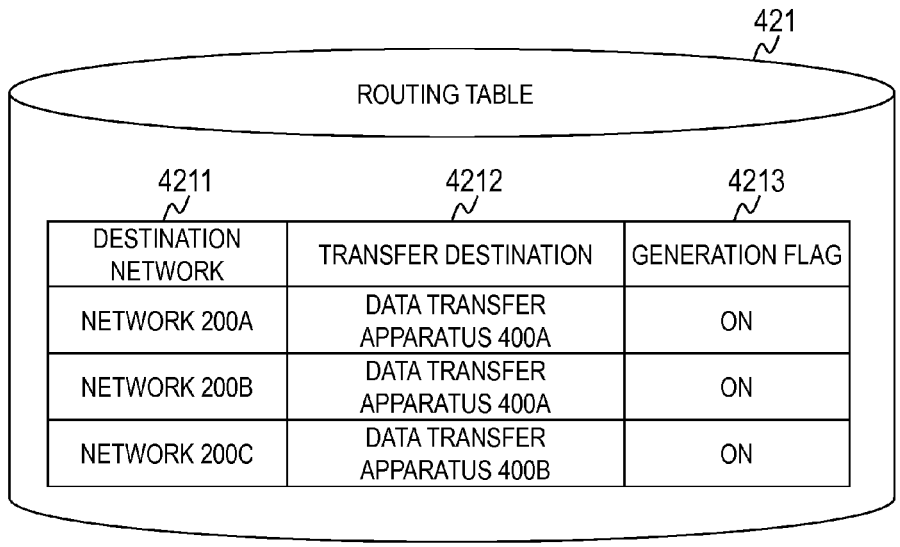
FIG. 4 is a descriptive diagram illustrating an example of a routing table held by the data transfer apparatus of the embodiment.

FIG. 4 is a descriptive diagram illustrating an example of the routing table 421 held by the data transfer apparatus 400 of the embodiment. FIG. 4 illustrates the routing table 421 held by the data transfer apparatus 400A. The data transfer apparatus 400B also holds the same routing table 421.

The routing table 421 of the present embodiment is table-type data and stores the transfer destination information that specifies the transfer destination of data in one entry. The entry includes a destination network 4211, a transfer destination 4212, and a generation flag 4213.

The destination network 4211 is identifiable information of the network 200 to which the data transfer apparatus 400 transmits data when the data is transferred to a transfer destination apparatus or the like. The transfer destination 4212 is identifiable information of the data transfer apparatus 400 to which data is transferred from the network 200 that corresponds to the destination network 4211.

FIG. 4 illustrates that the data transfer apparatus 400A is the transfer destination to which data is transferred next from the network 200A and the network 200B. In addition, FIG. 4 illustrates that the data transfer apparatus 400B is the transfer destination to which data is transferred next from the network 200C.

The generation flag 4213 is a flag that indicates whether an entry is generated by a normal process. The generation flag 4213 is set to either "ON" that indicates that the generation flag 4213 is validated or "OFF" that indicates that the generation flag 4213 is invalidated.

In the case of an entry that is generated by a recovery process using the transfer information base 441 stored on the non-volatile memory 440 at the time of reboot of the data transfer apparatus 400, the generation flag 4213 is set to "OFF". When an entry is generated in a method other than the recovery process, the generation flag 4213 is set to "ON".

Examples of the case where an entry is generated in a method other than the recovery process include a case where the routing table 421 is statically set by the operator of the network system 100 and a case where an entry is dynamically generated by transmitting and receiving the transfer destination information with other data transfer apparatuses 400 at the time of a normal operation.

Figure 5:
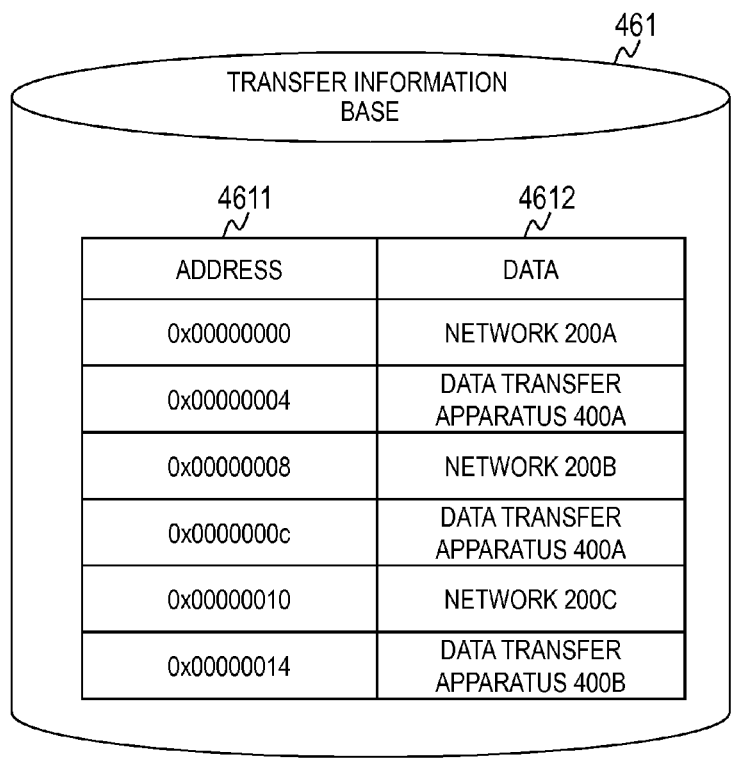
FIG. 5 is a descriptive diagram illustrating an example of a transfer information base held by the data transfer apparatus of the embodiment.

FIG. 5 is a descriptive diagram illustrating an example of the transfer information base 461 held by the data transfer apparatus 400 of the embodiment. FIG. 5 illustrates the transfer information base 461 held by the data transfer apparatus 400A. The data transfer apparatus 400B also holds the transfer information base 461.

The transfer information base 461 is information of a data format into which the routing table 421 is converted. The data format allows the transfer engine 450 to easily search for the transfer destination of data. The transfer information base 461 of the present embodiment is table-type data and stores information that specifies a destination in one entry. One entry includes an address 4611 and data 4612.

The address 4611 is an address of the volatile memory 460. The data 4612 is data stored in a memory region corresponding to the address 4611.

While the routing table 421 stores the transfer destination information in one entry, the transfer information base 461 stores part of the transfer destination information in the memory region that the address 4611 indicates. For example, the memory region that corresponds to the address 4611 of "0x00000000" stores "network 200A" that corresponds to the destination network 4211, and the memory region that corresponds to the address 4611 of "0x00000004" stores "data transfer apparatus 400A" that corresponds to the transfer destination 4212.

The transfer information base 441 stored on the non-volatile memory 440 is the same as the transfer information base 461 and thus will not be described. While the transfer information base 461 stored on the volatile memory 460 is used by the transfer engine 450 during a normal operation of the data transfer apparatus 400, the transfer information base 441 stored on the non-volatile memory 440 is not used by the transfer engine 450 at the time of an operation of the data transfer apparatus 400.

The transfer information base 461 illustrated in FIG. 5 is information in which the address of a memory region that stores part of the transfer destination information stored in the routing table 421 is associated with data. However, the transfer information base 461 is not limited to this. For example, the CPU 410 may store an entry in which an address is associated with data in the transfer information base 461 after converting the transfer destination information included in the routing table 421 into a data structure such as a hash table that is appropriate for searching.

Storing the transfer information base 441 on the non-volatile memory 440 as backup data of the transfer information base 461 stored on the volatile memory 460 is useful for measures against failure and for a quick resumption of data transfer. However, various problems arise when the transfer information base 461 is recovered with the transfer information base 441. That is, when the data transfer apparatus 400A is rebooted during an update of the transfer information base 461, there is the possibility of data inconsistency occurring between the transfer information base 461 and the transfer information base 441.

Data inconsistency occurs when, for example, an update of the transfer information base 461 is not ended yet while the transfer information base 441 is already updated. In addition, since hash values are different before reboot of the data transfer apparatus 400 and after reboot, inconsistency occurs in the data structures of the transfer information base 441 and the transfer information base 461, that is, data inconsistency occurs therein.

When the data transfer apparatus 400A recovers the transfer information base 461 of the volatile memory 460 by using the transfer information base 441 in a state where data inconsistency occurs, there is the possibility that data is transferred to an erroneous transfer destination or that the data transfer apparatus 400A is stopped when the transfer destination of the data is searched by using the transfer information base 461 that includes data in which inconsistency occurs.

When the data transfer apparatus 400B is stopped, it is necessary to remove the transfer destination information related to the network 200C from the routing table 421 and the transfer information base 461. When the data transfer apparatus 400A is operating normally, the transfer destination information related to the network 200C is also removed from the transfer information base 441 at the time of performing an update of the transfer information base 461. However, when the data transfer apparatus 400A is stopped, the transfer information base 441 is not updated.

Therefore, when modification occurs in a network configuration of the network system 100 while the data transfer apparatus 400A is stopped for a long time, there is the possibility that the transfer destination information stored in the transfer information base 441 is outdated. When the transfer engine 450 searches for the transfer destination of data on the basis of the transfer information base 461 that is recovered by using the transfer information base 441 which stores the outdated transfer destination information, there is the possibility of transferring data to an erroneous transfer destination or a non-existent transfer destination. Accordingly, there is the possibility that the network load of the network system 100 increases and that data loss occurs in the network system 100.

Figure 6:
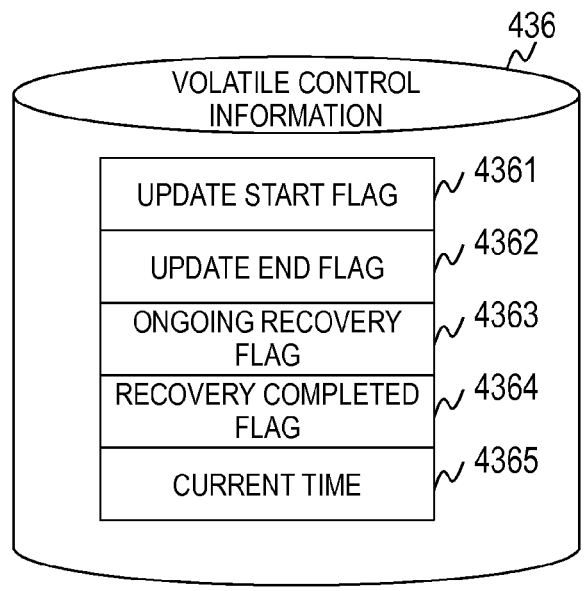
FIG. 6 is a descriptive diagram illustrating an example of volatile control information held by the recovery control unit of the embodiment.

FIG. 6 is a descriptive diagram illustrating an example of the volatile control information 436 held by the recovery control unit 430 of the embodiment.

The volatile control information 436 includes an update start flag 4361, an update end flag 4362, an ongoing recovery flag 4363, a recovery completed flag 4364, and a current time 4365.

The update start flag 4361 is a flag that notifies the recovery control unit 430 that the CPU 410 starts updating the transfer information base 441 and the transfer information base 461. The update start flag 4361 is set to either "ON" that indicates that the update start flag 4361 is validated or "OFF" that indicates that the update start flag 4361 is invalidated. The update start flag 4361 is set to "OFF" as an initial value. As described below, the CPU 410, when starting to update the transfer information base 441 and the transfer information base 461, sets the update start flag 4361 to "ON" by using the command 490.

The update end flag 4362 is a flag that notifies the recovery control unit 430 that the CPU 410 ends the update of the transfer information base 441 and the transfer information base 461. The update end flag 4362 is set to either "ON" that indicates that the update end flag 4362 is validated or "OFF" that indicates that the update end flag 4362 is invalidated. The update end flag 4362 is set to "OFF" as an initial value. As described below, the CPU 410, when ending the update of the transfer information base 441 and the transfer information base 461, sets the update end flag 4362 to "ON" by using the command 490.

The ongoing recovery flag 4363 is a flag that indicates that recovery is being performed with the transfer information base 441 by the recovery control unit 430 in the volatile memory 460. The ongoing recovery flag 4363 is set to either "ON" that indicates that the ongoing recovery flag 4363 is validated or "OFF" that indicates that the ongoing recovery flag 4363 is invalidated. The ongoing recovery flag 4363 is set to "OFF" as an initial value. As described below, the recovery control unit 430 sets the ongoing recovery flag 4363 to "ON" at the time of reboot of the data transfer apparatus 400.

The recovery completed flag 4364 is a flag that indicates that the recovery of the transfer information base 461 of the volatile memory 460 is ended by the recovery control unit 430. The recovery completed flag 4364 is set to either "ON" that indicates that the recovery completed flag 4364 is validated or "OFF" that indicates that the recovery completed flag 4364 is invalidated. The recovery completed flag 4364 is set to "OFF" as an initial value. As described below, the recovery control unit 430 sets the recovery completed flag 4364 to "ON" after the recovery of the transfer information base 461 ends.

The current time 4365 is information that represents the current time in the network system 100. Values stored in the current time 4365 are managed by the time managing unit 434 of the recovery control unit 430.

Figure 7:
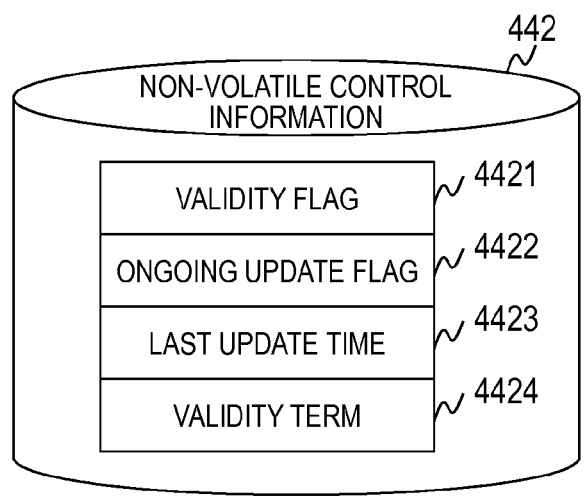
FIG. 7 is a descriptive diagram illustrating an example of non-volatile control information that is stored on a non-volatile memory of the embodiment.

FIG. 7 is a descriptive diagram illustrating an example of the non-volatile control information 442 that is stored on the non-volatile memory 440 of the embodiment.

The non-volatile control information 442 includes a validity flag 4421, an ongoing update flag 4422, a last update time 4423, and a validity term 4424.

The validity flag 4421 is a flag that indicates whether to recover the transfer information base 461 on the volatile memory 460 by using the transfer information base 441, that is, whether a recovery process is valid at the time of reboot of the data transfer apparatus 400. The validity flag 4421 is set to either "ON" that indicates that the validity flag 4421 is validated or "OFF" that indicates that the validity flag 4421 is invalidated. In the present embodiment, the operator sets the validity flag 4421 to either "ON" or "OFF" during a normal operation of the data transfer apparatus 400.

The recovery control unit 430 performs a recovery process only when the validity flag 4421 is set to "ON". The validity flag 4421 is set to "OFF" as an initial value. Accordingly, it is possible to suppress a recovery process being performed when there is no transfer destination information stored in the transfer information base 441, such as when the data transfer apparatus 400 is booted for the first time.

When it is expected that the data transfer apparatus 400 is stopped for a long time, it is possible to suppress a recovery process being performed when the data transfer apparatus 400 is rebooted after a long-time stop state is released, by setting the validity flag 4421 to "OFF".

The ongoing update flag 4422 is a flag that indicates whether the recovery control unit 430 is updating the transfer information base 441 and the transfer information base 461. The ongoing update flag 4422 is set to either "ON" that indicates that the ongoing update flag 4422 is validated or "OFF" that indicates that the ongoing update flag 4422 is invalidated. The ongoing update flag 4422 is set to "OFF" as an initial value.

When the ongoing update flag 4422 is "ON" at the time of reboot of the data transfer apparatus 400, this means that the data transfer apparatus 400 is stopped during an update of the transfer information base 441 and the transfer information base 461. In this case, since there is the possibility that inconsistency occurs in the transfer destination information stored in the transfer information base 441 and the transfer information base 461, the recovery control unit 430 does not perform a recovery process.

The last update time 4423 is a time at which the transfer information base 441 and the transfer information base 461 are updated for the last time. In the present embodiment, the recovery control unit 430, when the end of an update of the transfer information base 441 and the transfer information base 461 is notified from the CPU 410, sets the last update time 4423 to the value of the current time 4365 that is the point in time of the reception of the notification.

The validity term 4424 is the term of validity of the transfer information base 441 used in a recovery process. When the time set in the current time 4365 passes the term of validity set in the validity term 4424 at the time of reboot of the data transfer apparatus 400, there is the possibility that the transfer destination information stored in the transfer information base 441 is outdated. In this case, the recovery control unit 430 does not perform a recovery process.

The validity term 4424 may be set in advance to a fixed term or may be set to a term that is input by the operator during an operation of the data transfer apparatus 400. The term set in the validity term 4424 may be the absolute time of the current time 4365 or may be a time relative to the last update time 4423.

Figure 8:
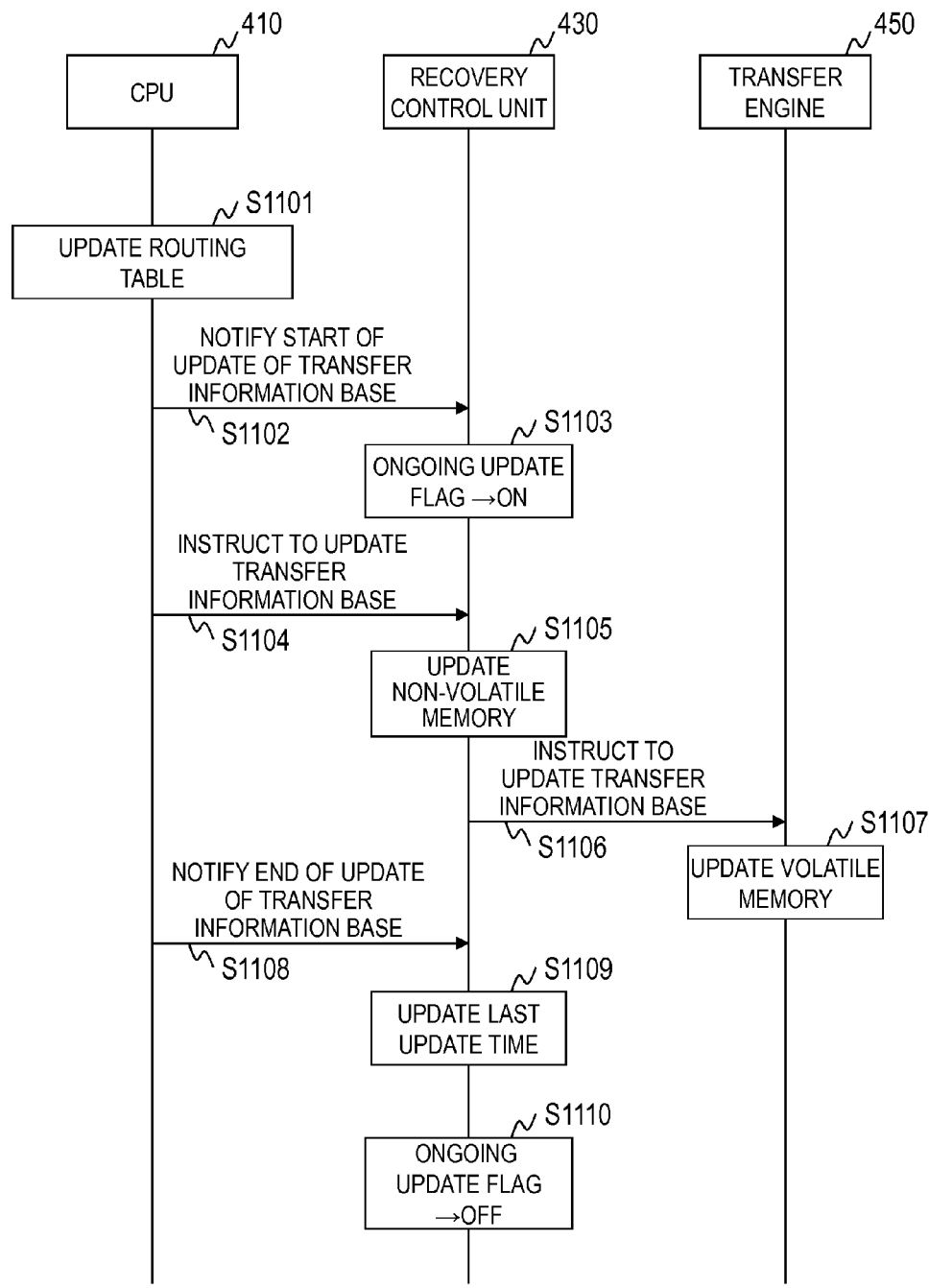
FIG. 8 is a sequence diagram illustrating the flow of an update of the transfer information base during a normal operation of the data transfer apparatus of the embodiment.

FIG. 8 is a sequence diagram describing the flow of an update of the transfer information base 441 and the transfer information base 461 during a normal operation of the data transfer apparatus 400 of the embodiment.

The CPU 410 updates the routing table 421 during a normal operation of the data transfer apparatus 400 (step S1101).

Triggers for updating the routing table 421 include a case where the information of the routing table 421 is set by the operator of the network system 100 and a case where the routing table 421 is dynamically updated by transmitting and receiving the transfer destination information with other data transfer apparatuses 400. At this time, the CPU 410, when adding an entry, sets the generation flag 4213 of the entry to "ON". In addition, when the generation flag 4213 of an updated entry is set to "OFF", the CPU 410 sets the generation flag 4213 to "ON".

The CPU 410 notifies the recovery control unit 430 of the start of an update of the transfer information base 441 and the transfer information base 461 by using the command 490 (step S1102).

Specifically, the CPU 410, after the routing table 421 is updated, sets the update start flag 4361 of the volatile control information 436 to "ON" by using the command 490. Afterward, the CPU 410 converts the transfer destination information stored in the updated routing table 421 into a predetermined data format and provides an instruction to update the transfer information base 441 and the transfer information base 461 by using the command 490 that includes the converted transfer destination information. The CPU 410 may transmit only the updated transfer destination information.

The recovery control unit 430 sets the ongoing update flag 4422 to "ON" when receiving the notification of the start of an update of the transfer information base 441 and the transfer information base 461 from the CPU 410 (step S1103).

Specifically, the recovery control unit 430, by detecting the update start flag 4361 being set to "ON", realizes that an update of the transfer information base 441 and the transfer information base 461 is started and sets the update start flag 4361 to "OFF". Afterward, the recovery control unit 430 sets the ongoing update flag 4422 to "ON".

The CPU 410 instructs the recovery control unit 430 to update the transfer information base 441 by using the command 490 that includes the transfer destination information generated by the conversion of the updated routing table 421 (step S1104).

The recovery control unit 430 updates the transfer information base 441 stored on the non-volatile memory 440 when receiving the instruction to update the transfer information base 441 from the CPU 410 (step S1105). The recovery control unit 430 instructs the transfer engine 450 to update the transfer information base 461 by using the command 490 (step S1106). The command 490 includes the converted transfer destination information.

The transfer engine 450 updates the transfer information base 461 stored on the volatile memory 460 when receiving the instruction to update the transfer information base 461 from the recovery control unit 430 (step S1107).

The CPU 410, when all the transfer destination information of the updated routing table 421 is transmitted, notifies the recovery control unit 430 of the end of the update of the transfer information base 441 and the transfer information base 461 by using the command 490 (step S1108).

Specifically, the CPU 410 sets the update end flag 4362 of the volatile control information 436 to "ON" by using the command 490. When only the updated transfer destination information is transmitted, the CPU 410 sets the update end flag 4362 of the volatile control information 436 to "ON" by using the command 490 after transmitting all the updated transfer destination information.

The recovery control unit 430, when receiving the notification of the end of the update of the transfer information base 441 and the transfer information base 461 from the CPU 410, updates the last update time 4423 on the basis of the time stored in the current time 4365 (step S1109) and sets the ongoing update flag 4422 to "OFF" (step S1110).

Specifically, the recovery control unit 430, by detecting the update end flag 4362 being set to "ON", realizes that the update of the transfer information base 441 and the transfer information base 461 ends and sets the update end flag 4362 to "OFF". Afterward, the recovery control unit 430 updates the last update time 4423 and sets the ongoing update flag 4422 to "OFF".

Figure 9:
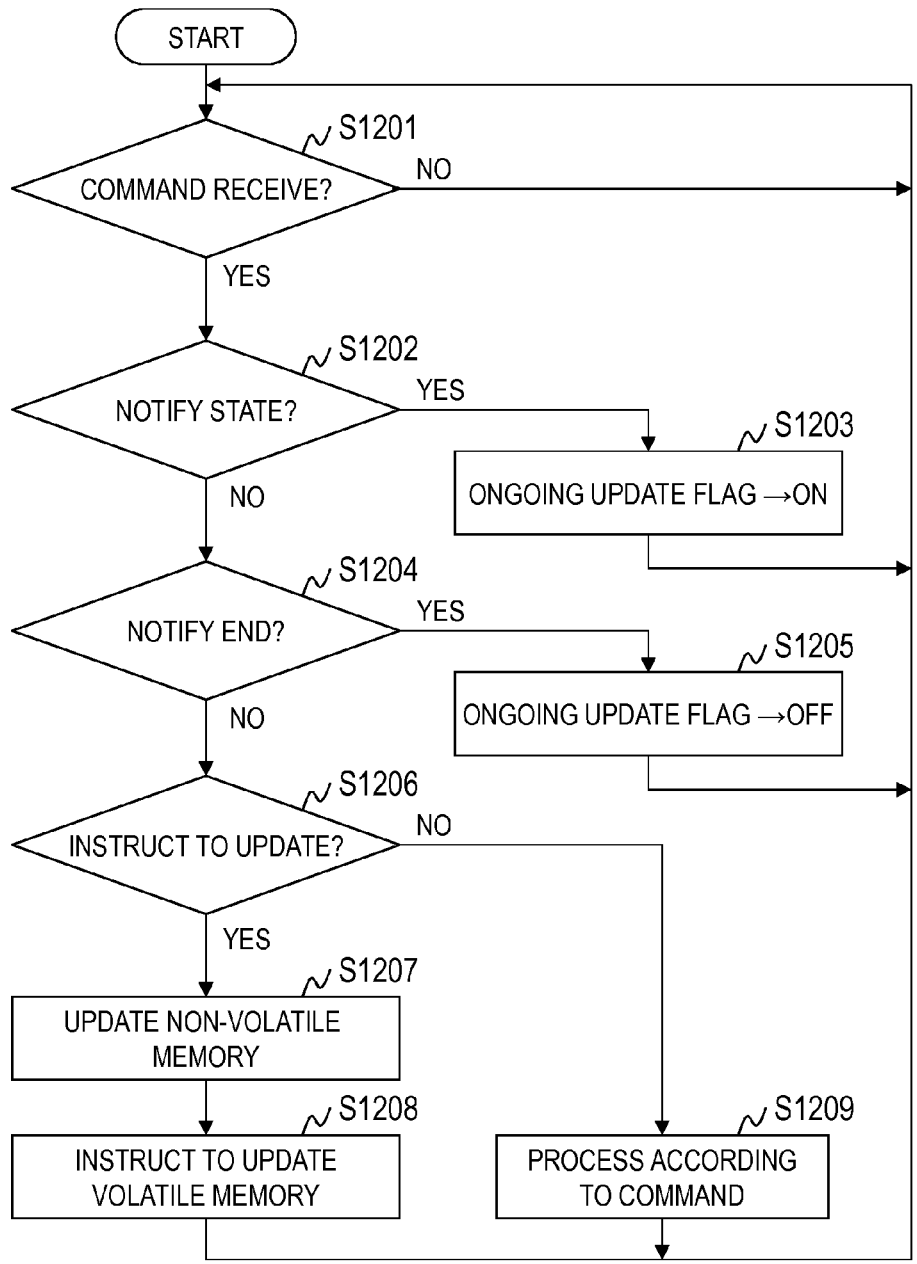
FIG. 9 is a flowchart illustrating a process that is performed by the recovery control unit of the embodiment at the time of an update of the transfer information base.

FIG. 9 is a flowchart describing a process that the recovery control unit 430 of the embodiment performs at the time of an update of the transfer information base 441 and the transfer information base 461.

The control processing unit 433 of the recovery control unit 430 starts a process described below when the data transfer apparatus 400 is booted. First, the control processing unit 433 determines whether the command 490 is received from the CPU 410 (step S1201).

When the command 490 is not received from the CPU 410 (NO in step S1201), the control processing unit 433 returns to step S1201 and repeatedly performs the same determination until receiving the command 490.

When the command 490 is received from the CPU 410 (YES in step S1201), the control processing unit 433 determines whether the command 490 received is a command that notifies the start of an update of the transfer information base 441 and the transfer information base 461 (step S1202).

Specifically, the control processing unit 433 determines whether the update start flag 4361 of the volatile control information 436 is set to "ON" by the command 490 received. When the update start flag 4361 of the volatile control information 436 is set to "ON" by the command 490 received, the control processing unit 433 determines that the command 490 received is a command that notifies the start of an update of the transfer information base 441 and the transfer information base 461.

When the command 490 received is a command that notifies the start of an update of the transfer information base 441 and the transfer information base 461 (YES in step S1202), the control processing unit 433 sets the ongoing update flag 4422 of the non-volatile control information 442 to "ON" (step S1203). Afterward, the control processing unit 433 returns to step S1201 and repeatedly performs the same determination until receiving the command 490.

When the command 490 received is not a command that notifies the start of an update of the transfer information base 441 and the transfer information base 461 (NO in step S1202), the control processing unit 433 determines whether the command 490 received is a command that notifies the end of an update of the transfer information base 441 and the transfer information base 461 (step S1204).

Specifically, the control processing unit 433 determines whether the update end flag 4362 of the volatile control information 436 is set to "ON" by the command 490 received. When the update end flag 4362 of the volatile control information 436 is set to "ON" by the command 490 received, the control processing unit 433 determines that the command 490 received is a command that notifies the end of an update of the transfer information base 441 and the transfer information base 461.

When the command 490 received is a command that notifies the end of an update of the transfer information base 441 and the transfer information base 461 (YES in step S1204), the control processing unit 433 sets the ongoing update flag 4422 of the non-volatile control information 442 to "OFF" (step S1205). Afterward, the control processing unit 433 returns to step S1201 and repeatedly performs the same determination until receiving the command 490.

When the command 490 received is not a command that notifies the end of an update of the transfer information base 441 and the transfer information base 461 (NO in step S1204), the control processing unit 433 determines whether the command 490 received is a command that provides an instruction to update the transfer information base 441 which includes the converted transfer destination information (step S1206).

When the command 490 received is a command that provides an instruction to update the transfer information base 441 (YES in step S1206), the control processing unit 433 updates the transfer information base 441 stored on the non-volatile memory 440 on the basis of the transfer destination information included in the command 490 (step S1207).

The control processing unit 433 instructs the transfer engine 450 to update the transfer information base 461 stored on the volatile memory 460 by transmitting the command 490 that instructs the transfer engine 450 to update the transfer information base 461 (step S1208). Afterward, the control processing unit 433 returns to step S1201 and repeatedly performs the same determination until receiving the command 490.

The data 4915 of the command 490 transmitted to the transfer engine 450 includes the transfer destination information that is included in the command 490 transmitted from the CPU 410. The transfer engine 450, when receiving the instruction to update the transfer information base 461 from the recovery control unit 430, updates the transfer information base 461 stored on the volatile memory 460 on the basis of the transfer destination information included in the command 490.

When the command 490 received is not a command that provides an instruction to update the transfer information base 441 (NO in step S1206), the control processing unit 433 performs a process according to the command 490 received (step S1209). Afterward, the control processing unit 433 returns to step S1201 and repeatedly performs the same determination until receiving the command 490.

Figure 10:
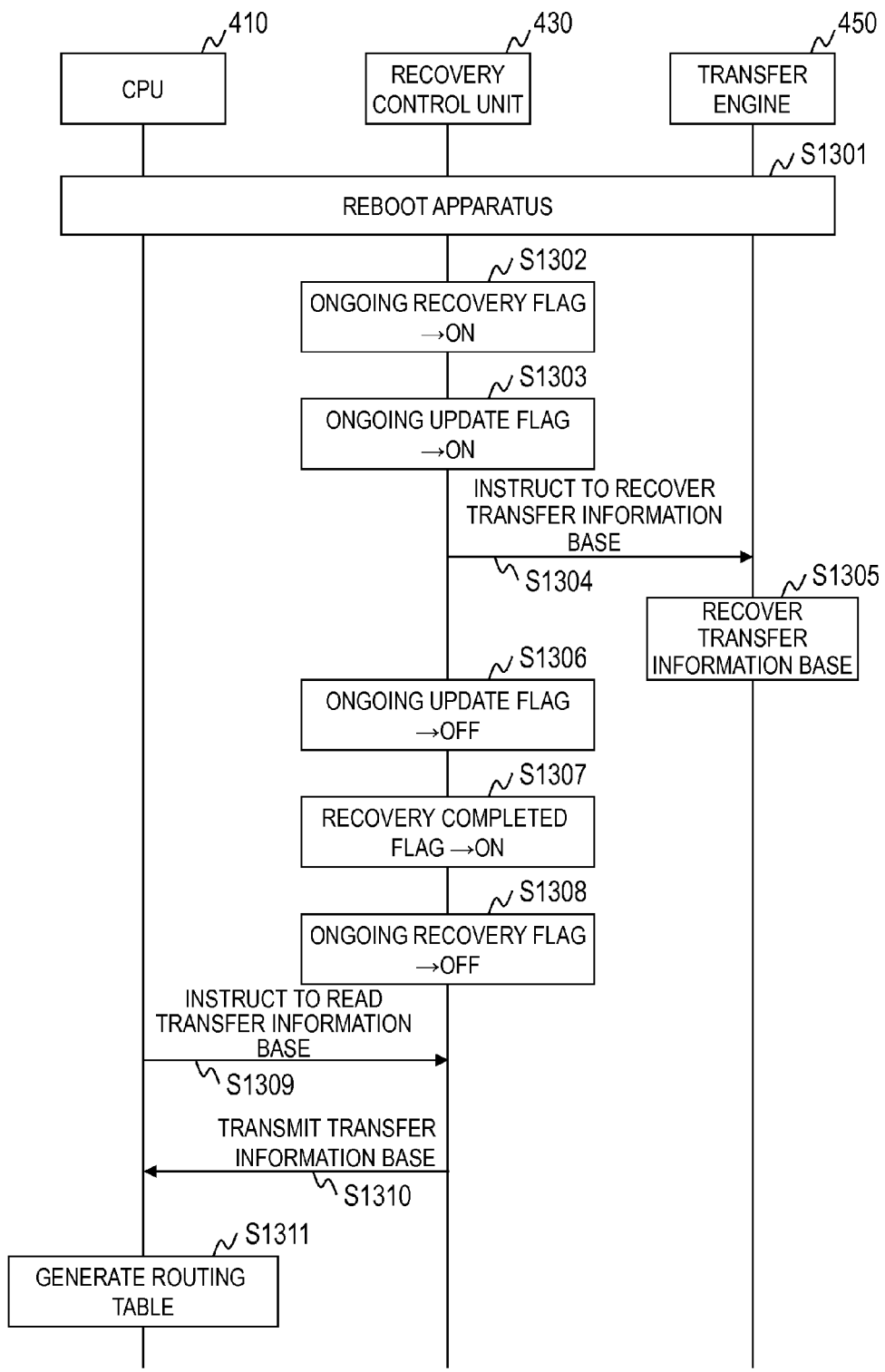
FIG. 10 is a sequence diagram illustrating the flow of the recovery of the transfer information base at the time of reboot of the data transfer apparatus of the embodiment.

FIG. 10 is a sequence diagram describing the flow of the recovery of the transfer information base 461 at the time of reboot of the data transfer apparatus 400 of the embodiment.

When the data transfer apparatus 400 is rebooted (step S1301), each of the CPU 410, the recovery control unit 430, and the transfer engine 450 starts a boot process.

The CPU 410, at this time, starts monitoring the ongoing recovery flag 4363. When the ongoing recovery flag 4363 is set to "ON", the recovery of the transfer information base 461 is performed by the recovery control unit 430. Thus, the CPU 410 periodically monitors the ongoing recovery flag 4363. Monitoring of the ongoing recovery flag 4363 uses the command 490 that provides an instruction to read the ongoing recovery flag 4363. Since the transfer information base 461 of the volatile memory 460 is empty, the transfer engine 450 does not start data transfer.

First, the recovery control unit 430 sets the ongoing recovery flag 4363 to "ON" (step S1302). At this time, the recovery control unit 430 checks that the validity flag 4421 is set to "ON".

The CPU 410, when detecting the ongoing recovery flag 4363 being set to "ON", suppresses an update of the transfer information base 441 and the transfer information base 461 while the ongoing recovery flag 4363 is set to "ON".

Next, the recovery control unit 430 sets the ongoing update flag 4422 to "ON" (step S1303) and, furthermore, by using the command 490, instructs the transfer engine 450 to recover the transfer information base 461 by using the transfer information base 441 (step S1304). The data 4915 of the command 490 transmitted to the transfer engine 450 includes the transfer destination information that is stored in the transfer information base 441.

The transfer engine 450, when receiving the instruction to recover the transfer information base 461 from the recovery control unit 430, recovers the transfer information base 461 on the volatile memory 460 by using the transfer destination information stored on the transfer information base 441 received (step S1305). Accordingly, the transfer information base 461 before stopping of the data transfer apparatus 400 can be quickly recovered. The transfer engine 450 can resume data transfer after the recovery of the transfer information base 461.

The recovery control unit 430 sets the ongoing update flag 4422 to "OFF" after the recovery of the transfer information base 461 ends in the transfer engine 450 (step S1306). The recovery control unit 430 determines that the recovery of the transfer information base 461 ends when, for example, all the transfer destination information stored in the transfer information base 441 is transmitted to the transfer engine 450 or when the command 490 that notifies the fact that the transfer information base 461 is recovered is received from the transfer engine 450.

The recovery control unit 430 sets the recovery completed flag 4364 to "ON" (step S1307) and, furthermore, sets the ongoing recovery flag 4363 to "OFF" (step S1308). Accordingly, the CPU 410 can detect the end of the recovery of the transfer information base 461.

The CPU 410, when detecting the ongoing recovery flag 4363 changing from "ON" to "OFF", reads the recovery completed flag 4364 and, after checking that the flag is set to "ON", instructs the recovery control unit 430 to read the transfer information base 441 by using the command 490 (step S1309). When the recovery completed flag 4364 is set to "OFF", the CPU 410 does not provide an instruction to read the transfer information base 441 until the recovery completed flag 4364 changes to "ON".

The recovery control unit 430, when receiving the instruction to read the transfer information base 441 from the CPU 410, reads the transfer destination information stored in the transfer information base 441 and transmits the read transfer destination information to the CPU 410 by using the command 490 (step S1310).

The CPU 410 generates the routing table 421 again on the basis of the transfer destination information stored in the read transfer information base 441 (step S1311).

Specifically, the CPU 410 generates the routing table 421 on the basis of the transfer destination information stored in the transfer information base 441. At this time, the CPU 410 sets the generation flag 4213 of each entry included in the routing table 421 to "OFF".

The CPU 410, after the process, updates the information of an entry and sets the generation flag 4213 of the entry to "ON" when the transfer destination information is set in a method other than recovering the transfer destination information on the basis of the read transfer information base 441, such as when the transfer destination information is statically set by the operator of the network system 100 or when the transfer destination information is dynamically set by transmitting and receiving the transfer destination information of the data with other data transfer apparatuses 400.

The CPU 410, when there is an entry of which the generation flag 4213 is set to "OFF" after the passage of a certain time, removes the entry from the routing table 421. Accordingly, it is possible to remove unnecessary transfer destination information and to clear outdated transfer destination information. The CPU 410 instructs the recovery control unit 430 to perform an update of the transfer information base 461 that is accompanied by the removal of the entry.

Figure 11:
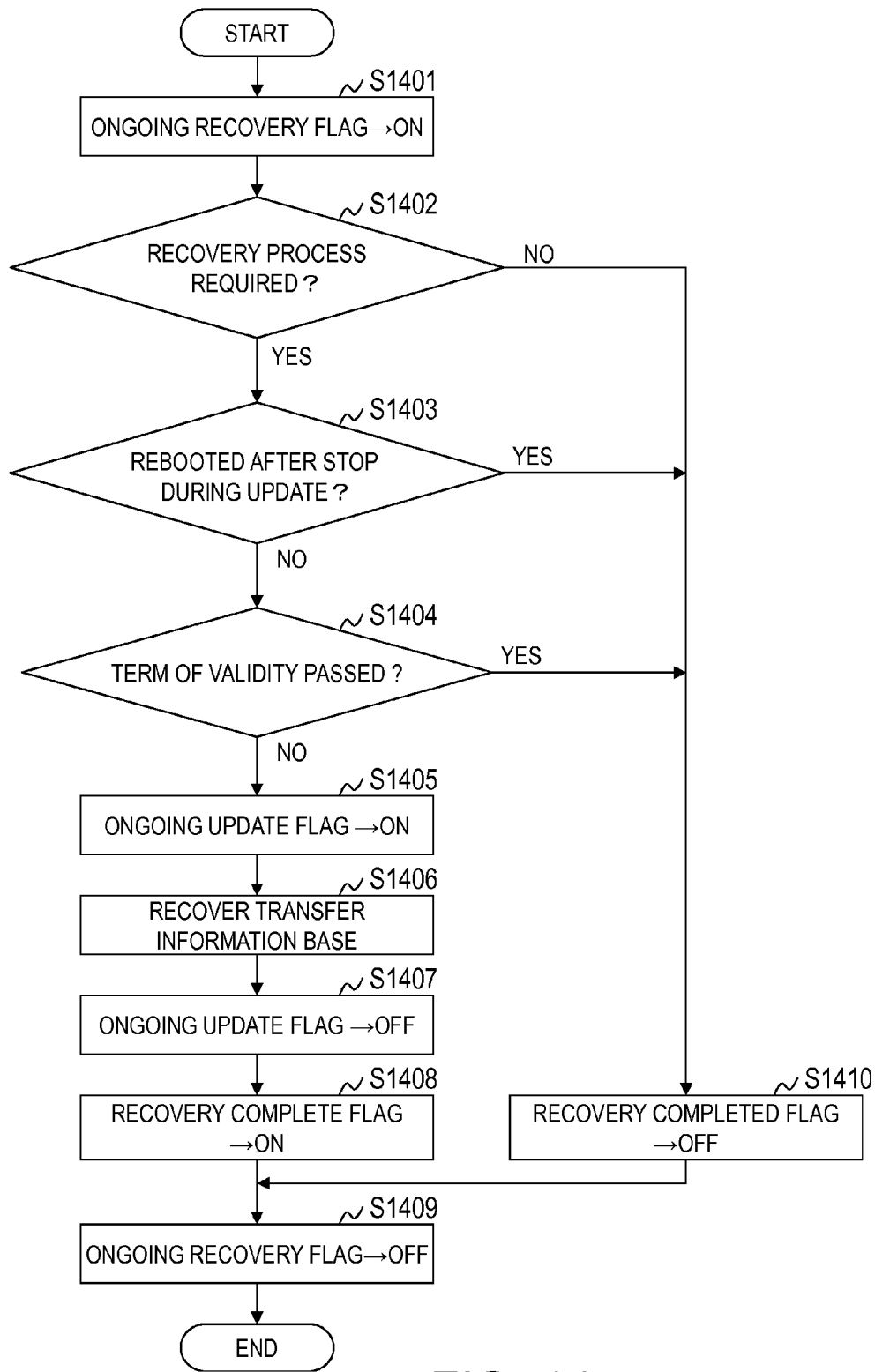
FIG. 11 is a flowchart illustrating the recovery of the transfer information base performed by the recovery control unit of the embodiment.

FIG. 11 is a flowchart describing the recovery of the transfer information base 461 performed by the recovery control unit 430 of the embodiment.

The control processing unit 433 of the recovery control unit 430 starts a process described below after the data transfer apparatus 400 is booted and after the CPU 410, the recovery control unit 430, and the transfer engine 450 are booted.

First, the control processing unit 433 sets the ongoing recovery flag 4363 to "ON" (step S1401) and determines whether it is necessary to perform the recovery of the transfer information base 461 (step S1402).

Specifically, the control processing unit 433 determines whether the validity flag 4421 is set to "ON". When the validity flag 4421 is set to "ON", the control processing unit 433 determines that it is necessary to perform the recovery of the transfer information base 461.

When it is not necessary to perform the recovery of the transfer information base 461 (NO in step S1402), the control processing unit 433 sets the recovery completed flag 4364 to "OFF" (step S1410) and then proceeds to step S1409. In this case, since the validity flag 4421 is set to "OFF", the recovery of the transfer information base 461 is not performed, and a normal boot process is performed by the CPU 410.

When it is necessary to perform the recovery of the transfer information base 461 (YES in step S1402), the control processing unit 433 determines whether the data transfer apparatus 400 is rebooted after a stop during an update of the transfer information base 441 and the transfer information base 461 (step S1403).

Specifically, the control processing unit 433 determines whether the ongoing update flag 4422 is set to "ON". When the ongoing update flag 4422 is set to "ON", the control processing unit 433 determines that the data transfer apparatus 400 is rebooted after a stop during an update of the transfer information base 441 and the transfer information base 461.

When the data transfer apparatus 400 is rebooted after a stop during an update of the transfer information base 441 and the transfer information base 461 (YES in step S1403), the control processing unit 433 sets the recovery completed flag 4364 to "OFF" (step S1410) and then proceeds to step S1409.

When the data transfer apparatus 400 is stopped during an update of the transfer information base 441 and the transfer information base 461, there is the possibility that inconsistency occurs in the transfer destination information stored in the transfer information base 441 and the transfer information base 461. Thus, when the data transfer apparatus 400 is rebooted after a stop during an update of the transfer information base 441 and the transfer information base 461, the recovery control unit 430 stops performing the recovery of the transfer information base 461 and performs control such that a normal boot process is performed.

When it is not the case that the data transfer apparatus 400 is rebooted after a stop during an update of the transfer information base 441 and the transfer information base 461 (NO in step S1403), the control processing unit 433 determines whether the term of validity set in the transfer information base 441 passes (step S1404).

Specifically, the control processing unit 433 determines whether the time of the current time 4365 is within the term of validity that is set in the validity term 4424.

When the term of validity set in the transfer information base 441 passes (YES in step S1404), the control processing unit 433 sets the recovery completed flag 4364 to "OFF" (step S1410) and then proceeds to step S1409.

When the term of validity set in the transfer information base 441 passes, there is the possibility that the transfer destination information stored in the transfer information base 441 is outdated. Thus, the recovery control unit 430 stops performing the recovery of the transfer information base 461 that uses the transfer information base 441 storing outdated transfer destination information and performs control such that a normal boot process is performed.

When the time does not elapse beyond the term of validity set in the transfer information base 441 (NO in step S1404), the control processing unit 433 sets the ongoing update flag 4422 to "ON" (step S1405) and recovers the transfer information base 461 on the volatile memory 460 (step S1406).

Specifically, the control processing unit 433 reads the transfer destination information from the transfer information base 441 of the non-volatile memory 440 and transmits the command 490 that includes the read transfer destination information, as an instruction to recover the transfer information base 461, to the transfer engine 450. The transfer engine 450, when receiving the command 490, recovers the transfer information base 461 on the basis of the transfer destination information included in the command 490.

The control processing unit 433, after the recovery of the transfer information base 461 ends, sets the ongoing update flag 4422 to "OFF" (step S1407) and, furthermore, sets the recovery completed flag 4364 to "ON" (step S1408).

The control processing unit 433 determines that the update of the transfer information base 461 ends when, for example, all the transfer destination information stored in the transfer information base 441 is transmitted to the transfer engine 450 or when the command 490 that notifies the fact that the transfer information base 461 is recovered is received from the transfer engine 450.

After the process of step S1408 or step S1410 is performed, the control processing unit 433 sets the ongoing recovery flag 4363 to "OFF" (step S1409). Afterward, the control processing unit 433 ends the recovery of the transfer information base 461.

The CPU 410 resumes the update of the transfer information base 441 and the transfer information base 461 when the ongoing recovery flag 4363 is set to "OFF". At this time, the process of the CPU 410 branches into processes as follows according to the state of the recovery completed flag 4364.

When the recovery completed flag 4364 is set to "ON", the CPU 410 regenerates the routing table 421 by using the transfer information base 441 and subsequently performs an update of the routing table 421 and an update of the transfer information base 441 and the transfer information base 461.

When the recovery completed flag 4364 is set to "OFF", the CPU 410, since the transfer information base 461 of the volatile memory 460 is not recovered, does not perform the generation of the routing table 421 that uses the transfer information base 441. When the recovery completed flag 4364 is set to "OFF", there is the possibility that erroneous transfer destination information is stored in the transfer information base 441. Thus, the CPU 410, as when the data transfer apparatus 400 is normally booted, generates the routing table 421 again and updates the transfer information base 441 and the transfer information base 461 after initializing the transfer information base 441 and the transfer information base 461.

The initialization of the transfer information base 441 and the transfer information base 461 at the time of normal booting of the data transfer apparatus 400 indicates that a state where new transfer destination information can be stored is brought about by deleting the information stored in the transfer information base 441 and the transfer information base 461. The CPU 410 generates the routing table 421 on the basis of information and the like that are set in advance by the operator.

When the data transfer apparatus 400 is stopped during the recovery of the transfer information base 461, there is the possibility that inconsistency occurs in the transfer information base 441 as when the data transfer apparatus 400 is stopped during a normal update of the transfer information base 441 and the transfer information base 461. Thus, the control processing unit 433, by manipulating the ongoing update flag 4422, can avoid a recovery process being performed at the time of a reboot even if the data transfer apparatus 400 is stopped during the recovery of the transfer information base 461.

In the process illustrated in FIG. 11, while the control processing unit 433 determines whether the term of validity passes in step S1404 when the ongoing recovery flag 4363 is set to "ON", the process of step S1404 may not be performed when the term of validity is not considered.

As described thus far, according to the embodiment, the recovery control unit 430 controls an update of the transfer information base 441, which is backup data of the transfer information base 461, stored on the non-volatile memory 440 and checks the consistency of the transfer information base 441 at the time of reboot of the data transfer apparatus 400. When the transfer information base 441 is consistent, the recovery control unit 430 recovers the transfer information base 461 on the volatile memory 460 by using the transfer information base 441.

Data transfer can be quickly resumed at the time of reboot of the data transfer apparatus 400 by recovering the transfer information base 461 with the transfer information base 441 stored on the non-volatile memory 440 when the transfer information base 441 and the transfer information base 461 are consistent. In addition, since the recovery of the transfer information base 461 by using the transfer information base 441 is suppressed when the transfer information base 441 and the transfer information base 461 are not consistent, it is possible to avoid the transfer of data to an erroneous transfer destination or stopping and the like of the data transfer apparatus 400.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java (registered trademark).

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A transfer apparatus that transfers data, the apparatus comprising:
    a CPU;
    a main memory coupled to the CPU;
    a recovery control unit coupled to the CPU which controls the recovery of information at a time of reboot of the transfer apparatus;
    a non-volatile memory coupled to the recovery control unit;
    a transfer engine coupled to the recovery control unit which controls the transfer of the data; and
    a volatile memory coupled to the transfer engine,
    wherein the main memory stores routing information that indicates a transfer destination of the data,
    wherein the volatile memory stores a first transfer information base that is information corresponding to the routing information and that is used in a case where the transfer engine determines the transfer destination of the data,
    wherein the non-volatile memory stores a second transfer information base that is backup data of the first transfer information base,
    wherein the transfer engine is configured to:
    determine the transfer destination of data received by the transfer apparatus by using the first transfer information base; and
    transfer the received data to the determined transfer destination, and
    wherein the recovery control unit is configured to:
    update the second transfer information base on update data in a case of receiving an instruction to update the second transfer information base stored on the non-volatile memory including the update data from the CPU, on the basis of the transfer destination information included in the instruction;
    transmit an instruction to update the first transfer information base including the update data to the transfer engine;
    check the consistency of the first transfer information base and the second transfer information base in a case where the transfer apparatus is rebooted; and
    recover the first transfer information base by using the second transfer information base in a case where the first transfer information base is consistent with the second transfer information base.

2. The transfer apparatus according to claim 1,
    wherein the recovery control unit is configured to determine that the first transfer information base is not consistent with the second transfer information base in a case where the transfer apparatus is rebooted in a state where an update of the second transfer information base is not completed.

3. The transfer apparatus according to claim 2,
    wherein the non-volatile memory stores control information that includes a first flag which indicates that the first transfer information base and the second transfer information base are being updated, and wherein the recovery control unit is configured to:
validate the first flag in a case of receiving an instruction to start updating the second transfer information base from the CPU;
invalidate the first flag in a case of receiving an instruction to end the update of the second transfer information base from the CPU;
determine whether the first flag is validated by referring to the control information in a case where the transfer apparatus is rebooted; and
determine that the first transfer information base is consistent with the second transfer information base in a case of determining that the first flag is invalidated.

4. The transfer apparatus according to claim 3,
wherein the recovery control unit is configured to:
validate the first flag in a case of determining that the first transfer information base is consistent with the second transfer information base; and
invalidate the first flag in a case of detecting completion of a recovery of the first transfer information base.

5. The transfer apparatus according to claim 3,
wherein the control information includes term information that indicates a term of validity of the second transfer information base used in a recovery of the first transfer information base, and
wherein the recovery control unit is configured to:
obtain the term information from the control information in a case of determining that the first flag is invalidated;
determine whether the term of validity passes based on a current time and the term information; and
determine that the first transfer information base is consistent with the second transfer information base in a case of determining that the term of validity does not pass.

6. The transfer apparatus according to claim 3,
wherein the routing information stores a plurality of pieces of transfer destination information, each of which indicates a transfer destination of data,
a piece of transfer destination information includes a second flag that indicates that the piece of transfer destination information is not generated based on the second transfer information base, and
wherein the CPU is configured to:
read the second transfer information base from the non-volatile memory in a case of detecting the first transfer information base being recovered by the recovery control unit;
recover the routing information by generating the transfer destination information using the read second transfer information base;
invalidate the second flag included in each of the plurality of pieces of transfer destination information stored in the recovered routing information;
validate the second flag included in the each of the plurality of pieces of updated transfer destination information in a case where the plurality of pieces of transfer destination information stored in the recovered routing information are updated, and
remove at least one of the plurality of pieces of transfer destination information of which the second flag is invalidated from the routing information in a case where the at least one of the plurality of pieces of transfer destination information of which the second flag is invalidated among the plurality of pieces of transfer destination information stored in the recovered routing information is not updated for a certain period of time.

7. A recovery control device that controls a recovery process which uses backup data at the time of reboot of a transfer apparatus which transfers data, wherein
the transfer apparatus includes a CPU and a transfer engine,
the CPU couples to the transfer engine through the recovery control device,
a main memory coupled to the CPU stores routing information that indicates a transfer destination of the data,
a volatile memory coupled to the transfer engine stores a first transfer information base which is information corresponding to the routing information and that is used in a case where the transfer engine determines the transfer destination of the data, and
the recovery control device is configured to:
connect to a non-volatile memory that stores a second transfer information base which is backup data of the first transfer information base,
update the second transfer information base stored on the non-volatile memory on update data in a case of receiving an instruction to update the second transfer information base including the update data from the CPU, on the basis of the transfer destination information included in the instruction,
transmit an instruction to update the first transfer information base including the update data to the transfer engine,
check the consistency of the first transfer information base and the second transfer information base in a case where the transfer apparatus is rebooted, and
recover the first transfer information base by using the second transfer information base in a case where the first transfer information base is consistent with the second transfer information base.

8. The recovery control device according to claim 7,
wherein the recovery control device is configured to determine that the first transfer information base is not consistent with the second transfer information base in a case where the transfer apparatus is rebooted in a state where an update of the second transfer information base is not completed.

9. The recovery control device according to claim 8,
wherein the non-volatile memory stores control information that includes a first flag which indicates that the first transfer information base and the second transfer information base are being updated, and
wherein the recovery control device is configured to:
validate the first flag in a case of receiving an instruction to start updating the second transfer information base from the CPU;
invalidate the first flag in a case of receiving an instruction to end the update of the second transfer information base from the CPU;
determine whether the first flag is validated by referring to the control information in a case where the transfer apparatus is rebooted; and
determine that the first transfer information base is consistent with the second transfer information base in a case of determining that the first flag is invalidated.

10. The recovery control device according to claim 9,
wherein the recovery control device is configured to:
validate the first flag in a case of determining that the first transfer information base is consistent with the second transfer information base; and
invalidate the first flag in a case of detecting completion of a recovery of the first transfer information base.

11. The recovery control device according to claim 9,
wherein the control information includes term information that indicates a term of validity of the second transfer information base used in a recovery of the first transfer information base, and
wherein the recovery control device is configured to:
obtain the term information from the control information in a case of determining that the first flag is invalidated;
determine whether the term of validity passes based on a current time and the term information; and
determine that the first transfer information base is consistent with the second transfer information base in a case of determining that the term of validity does not pass.

* * * * *